(12) United States Patent
Burkland et al.

(10) Patent No.: US 8,018,704 B2
(45) Date of Patent: Sep. 13, 2011

(54) PARALLEL ANALOG AND DIGITAL TIMERS IN POWER CONTROLLER CIRCUIT BREAKER

(75) Inventors: William Andrew Burkland, Huxley, IA (US); Adolfo A. Garcia, Santa Clara, CA (US)

(73) Assignee: Micrel, Inc., San Jose, CA (US)

( * ) Notice: Subject to any disclaimer, the term of this patent is extended or adjusted under 35 U.S.C. 154(b) by 1247 days.

(21) Appl. No.: 11/466,741

(22) Filed: Aug. 23, 2006

(65) Prior Publication Data

US 2008/0055808 A1    Mar. 6, 2008

(51) Int. Cl.
*H02H 3/05* (2006.01)
(52) U.S. Cl. .......................................................... 361/94
(58) Field of Classification Search ....................... 361/94
See application file for complete search history.

(56) References Cited

U.S. PATENT DOCUMENTS

| | | | |
|---|---|---|---|
| 4,424,745 A * | 1/1984 | Magorian et al. ............. | 102/215 |
| 5,563,526 A * | 10/1996 | Hastings et al. .............. | 326/37 |
| 6,118,642 A * | 9/2000 | Benenati et al. ............... | 361/89 |
| 7,079,368 B2 * | 7/2006 | Ishikawa et al. ............. | 361/93.1 |
| 2004/0184206 A1 * | 9/2004 | Nomura et al. ................ | 361/31 |
| 2005/0184710 A1 * | 8/2005 | Souma .......................... | 323/276 |
| 2005/0231874 A1 * | 10/2005 | Hussein et al. ............... | 361/93.1 |

* cited by examiner

*Primary Examiner* — Rexford Barnie
*Assistant Examiner* — Nicholas Ieva
(74) *Attorney, Agent, or Firm* — Patent Law Group LLP

(57) ABSTRACT

A circuit breaker for a power controller integrated circuit is described where an analog timer and a digital timer are provided in parallel. The digital timer provides a fixed, on-chip maximum delay during an overcurrent condition to ensure the transistor will not be damaged. The analog timer allows the user to select an external capacitor or resistor to provide a delay time that is shorter than the time provided by the digital timer. Accordingly, the power controller retains all the flexibility of an analog timer but prevents the overcurrent exceeding a maximum time limit. An autoretry circuit is also included in the power controller which prevents the duty cycle from exceeding a maximum. The autoretry timer is a digital timer that uses the same oscillator as the digital timer for the circuit breaker so the ratio of the delay times is known and fixed.

18 Claims, 3 Drawing Sheets

PARALLEL ANALOG AND DIGITAL TIMERS IN POWER CONTROLLER CIRCUIT BREAKER

FIELD OF THE INVENTION

This invention relates to circuit breakers in power controllers for sensing overcurrent faults and disconnecting power to electronic equipment in the case of an overcurrent condition.

BACKGROUND

A conventional power controller integrated circuit controls a power transistor to couple or decouple a power supply from a load to be powered. The power controller typically detects overcurrent faults, detects voltage levels, detects externally-generated control signals such as an enable signal, and senses other conditions to determine whether to couple or decouple the power supply to or from the load. The overcurrent circuit acts like a circuit breaker, where the current through the transistor is detected and, if it is above a threshold level, the power controller turns off the transistor.

Since the current threshold may be momentarily exceeded due to a current surge when the load is first powered up or due to some other transitory reason, the power controller typically includes a delay circuit which allows the current to exceed the threshold for a short period of time without tripping the circuit breaker. If the overcurrent period exceeds the delay time, the power controller turns off the transistor, and the system must be reset, after the fault is fixed, before the transistor is turned on again. This avoids nuisance faults.

It is important that the delay time during which the overcurrent exists does not exceed a time that will damage the transistor or damage the load or other components. Accordingly, a maximum time for the delay must not be exceeded.

Some power controllers include an autoretry circuit that automatically resets the circuit breaker, after a delay, one or more times after the circuit breaker is tripped in case the previous overcurrent situation has been cleared up. It is important that the reset of the transistor does not occur too soon after the initial shutting off of the transistor since the transistor may heat up and become damaged due to being repeatedly turned on during an overcurrent condition. The ratio of the time that the transistor is on during the overcurrent versus the total cycle time (i.e., the duration of the time that the transistor is on during the overcurrent plus the delay between the autoretry attempt) is referred to as a duty cycle of the transistor during the overcurrent. The duty cycle must not exceed a maximum in order to prevent damage to the transistor.

The delay circuits in the circuit breakers and autoretry circuits may be analog or digital. Analog delay circuits set the delay time by selecting the value of a capacitor that is charged between an initial voltage (e.g., 0 volts) and a threshold voltage. A larger capacitor increases the tripping time. Such capacitors are external to the power controller package and provide flexibility to the user. The analog delay may also be set by selecting an external resistor in addition to the capacitor to set the time constant. Digital timers may be integrated on the same chip as the power controller and are thus inexpensive, but provide no flexibility to the user since the delay time is fixed.

When using an analog timer, the user may err and use a capacitor that provides too much delay and damages the transistor in an overcurrent condition. Similarly, the user may use a capacitor in the analog timer for the autoretry that results in the transistor exceeding its maximum duty cycle for the overcurrent.

What is needed is a technique to prevent the transistor controlled by a power controller being damaged due to a sustained overcurrent or a duty cycle that is too high.

SUMMARY

A circuit breaker for a power controller is described where an analog timer and a digital timer are provided in parallel. The digital timer is implemented entirely on the power controller chip so adds no cost to the power system. The digital timer provides a maximum delay during an overcurrent condition to ensure the transistor will not be damaged. The analog timer allows the user to select an external capacitor or resistor to provide a delay time that is shorter than the time provided by the digital timer. The user may disable the analog timer by not using a capacitor and connecting a terminal to ground. Accordingly, the power controller retains all the flexibility of an analog timer but prevents the overcurrent exceeding a maximum time limit.

An autoretry circuit is also included in the power controller which prevents the duty cycle from exceeding a maximum. The autoretry timer is a digital timer that uses the same oscillator as the digital timer for the circuit breaker. Both digital timers are counters, with the autoretry counter having a higher count than the circuit breaker digital timer before triggering. Since the autoretry timer is a fixed time and runs off the same oscillator as the circuit breaker digital counter, a maximum duty cycle of the transistor is enforced which cannot be altered by the user.

DETAILED DESCRIPTION

Figure 1:
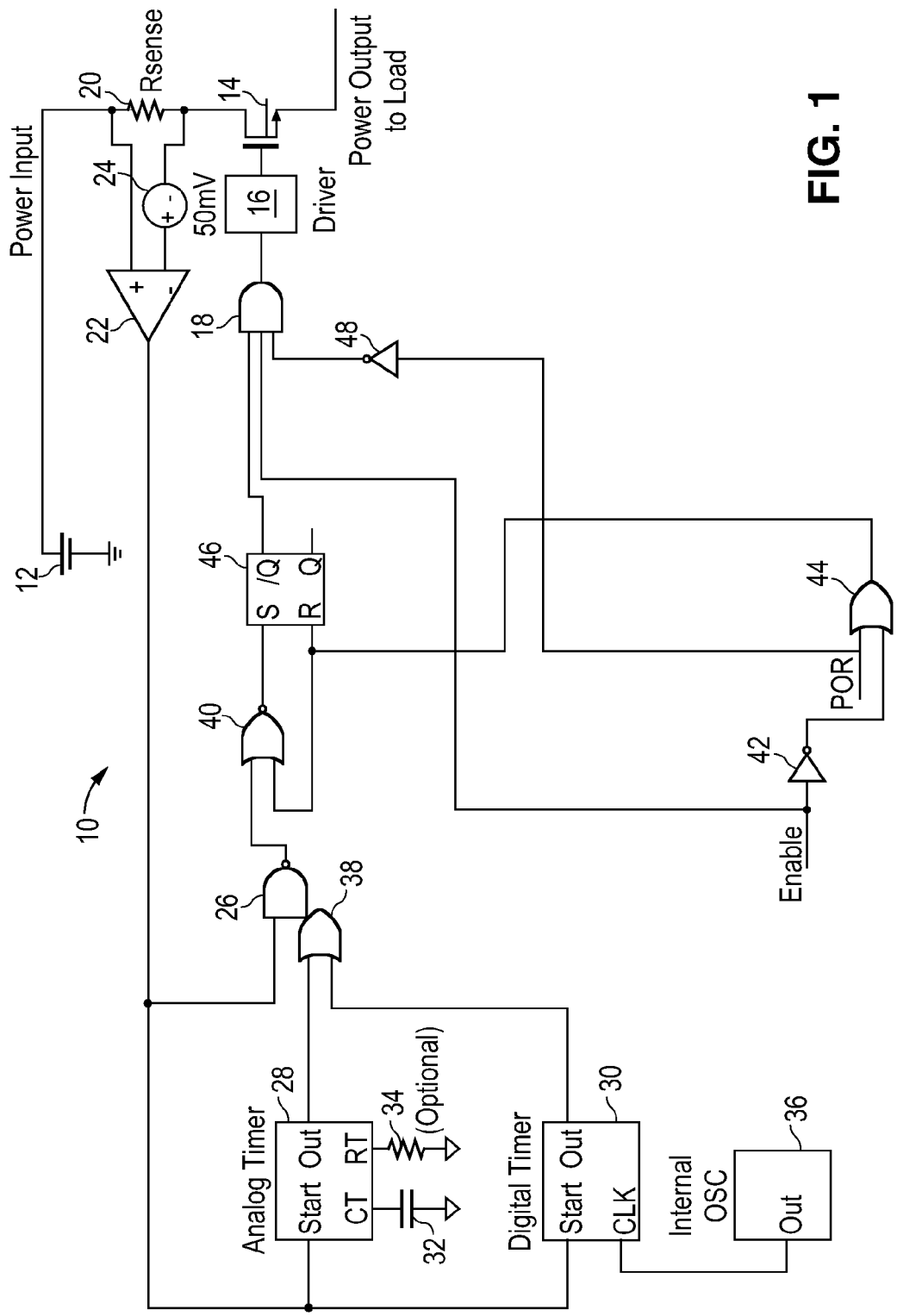
FIG. 1 illustrates a portion of a power controller, implemented as an integrated circuit with various external components, where the analog timer and digital timer used in a circuit breaker are connected in parallel.

FIG. 1 illustrates the pertinent portions of a power controller 10. The main function of the power controller 10 is to receive a power supply voltage 12 and switch a transistor 14 to couple or decouple the power supply voltage 12 to or from a load. The switch in FIG. 1 is a MOSFET; however, other types of switches (even non-transistor switches) can be used. A driver 16 receives a logical 1 or 0 signal from an AND gate 18 and converts the logical voltage to a suitable gate voltage to turn the transistor 14 either on or off.

The remainder of the circuit is primarily for acting as a circuit breaker in the event an overcurrent through the transistor 14 is sensed.

The current to the load passes through a low value sense resistor 20 (e.g., 0.02 ohms), connected in series with the transistor 14. The sense resistor 20 and transistor 14 will typically be external to the power controller integrated circuit package to give the user flexibility in choosing a suitable transistor 14. One terminal of the resistor 20 is connected to a comparator 22, and the other end of the resistor 20 is connected to an offset voltage 24. In the example of FIG. 1, the offset voltage is 50 mV. The comparator 22 is triggered (output goes high) when the current to the load causes the voltage across the sense resistor 20 to exceed 50 mV. At that current level, an overcurrent situation exists.

The high output of the comparator 22 is applied to one input of a NAND gate 26. The high output of the comparator 22 also starts an analog timer 28 and a digital timer 30.

The analog timer 28 starts by closing a switch that couples a fixed current source (e.g., 2.5 microamps) to a timing capacitor 32. A comparator in timer 28 compares the capacitor voltage to a reference (e.g., 1.25 v). When the capacitor voltage exceeds the reference, the output of the timer goes high. The timer 28 is turned off and the capacitor is discharged when a logical 0 is applied to the start input of the timer 28. The larger the capacitor 32, the longer the delay before the timer 28 trips. An optional resistor 34 may be connected to the timer 28 to change the trip level of the timer 28. If a resistor 34 is also used, increasing the value of the resistor increases the delay. In one embodiment, the timer 28 delay in milliseconds equals C (in microfarads)×R (in kohms)×5. The analog timer 28 will typically be set to be less than 40 ms. All portions of the analog timer 28 except for the capacitor 32 and resistor 34 are on the power controller integrated circuit chip. The timer 28 circuitry may be conventional.

The digital timer 30 is a counter that increments every clock pulse. The clock pulses are supplied by an oscillator 36. The entire digital timer 30 and oscillator are on the power controller integrated circuit chip. The timer 30 and oscillator 36 circuitry may be conventional. An example of a suitable delay time for the digital timer is 40 ms, equivalent to 4092 clock cycles supplied by oscillator 36. After the timer 30 times out, its output will generate a logical high pulse. The timer 30 is off when the signal at its start terminal is low.

The outputs of both timers 28 and 30 are applied to an OR gate 38, so the two timers operate in parallel, and the one that times out first controls the circuit breaker function. The output of the OR gate 38 is connected to the second input of the NAND gate 26. Upon an overcurrent tripping the comparator 22, the output of the NAND gate 26 will be a logical 1 until one of the timers 28 or 30 times out, and will then become a logical 0 after the first timer times out, assuming the overcurrent still exists.

The output of the NAND gate 26 is connected to an input of a NOR gate 40. A second input into the NOR gate 40 is a logical 0 when an externally generated enable signal to the power controller chip is high and there is no power-on-reset (POR) pulse generated internal to the power controller. The POR pulse is generated when the power controller has adequate power initially applied to it. Conversely, the second input to the NOR gate 40 is a logical 1 if either the enable signal has been deasserted or the POR pulse is generated.

The enable signal is coupled to the input of an inverter 42 whose output is connected to an OR gate 44. The POR signal is also connected to the OR gate 44. The output of the OR gate 44 is coupled to the second input of the NOR gate 40. The external toggling ON-OFF-ON of the enable terminal of the power controller acts as a signal to clear all fault flags (including resetting the circuit breaker).

Assuming the power controller is enabled and there is no POR pulse, the output of the NOR gate 40 will be: Condition 1) a logical 0 after an overcurrent has been detected but before either timer 28 or 30 has timed out; or Condition 2) a logical 1 after an overcurrent has been detected and one of the timers 28 or 30 has timed out.

The output of the NOR gate 40 is connected to a set input of an SR flip flop 46, and the output of the OR gate 44 is connected to the reset input of the flip flop 46. Upon Condition 1 occurring, the logical 0 signal output from the NOR gate 40 will not affect the state of the flip flop 46 since the flip flop 46 had been previously reset upon the power controller starting up. Accordingly, upon Condition 1 occurring, the set signal is a logical 0, and the inverted Q output (identified as /Q in FIG. 1) of the flip flop will remain a logical 1 since the flip flop 46 was previously reset. The logical 1 output at the /Q terminal is applied to an input of the AND gate 18. The other two inputs into the AND gate are the enable signal and an inverted POR signal supplied by inverter 48. Assuming the enable signal is high and there is no POR pulse, all inputs into the AND gate 18 are high, and the AND gate 18 continues to control the driver 16 to keep transistor 14 on.

Upon a first of the timers 28 and 30 to time out while there is an overcurrent condition, Condition 2 results, where the output of the NOR gate 40 goes high. In this case, the flip flop becomes set, and the /Q output goes low. This logical 0 is applied to the AND gate 18 to cause the AND gate 18 to output a logical 0 and turn off the driver 16 and transistor 14. Power is thus removed from the load.

Since the digital timer 30 is guaranteed to time out at a preset time, not controlled by the user, there is no chance that the user could inadvertently set a damaging delay time by choosing a wrong value for the timing capacitor 32. This avoids damage to the transistor 14 as well as the load. If the user wants a shorter delay time (e.g., 40 ms) then provided by the digital timer 30, the user may use the equations for calculating the analog timer 28 delay time to set the desired delay (e.g., 1-39 ms). The user may disable the analog timer 28 by connecting the timing capacitor terminal to ground.

In another embodiment, an additional current sense comparator having a higher offset voltage than provided by offset voltage 24 is used to detect a larger overcurrent that is clearly a "permanent" fault condition and immediately shuts off the transistor 14. The output of such an additional current sense comparator may be coupled so as to immediately apply a high set signal to the flip flop 46.

Figure 2:
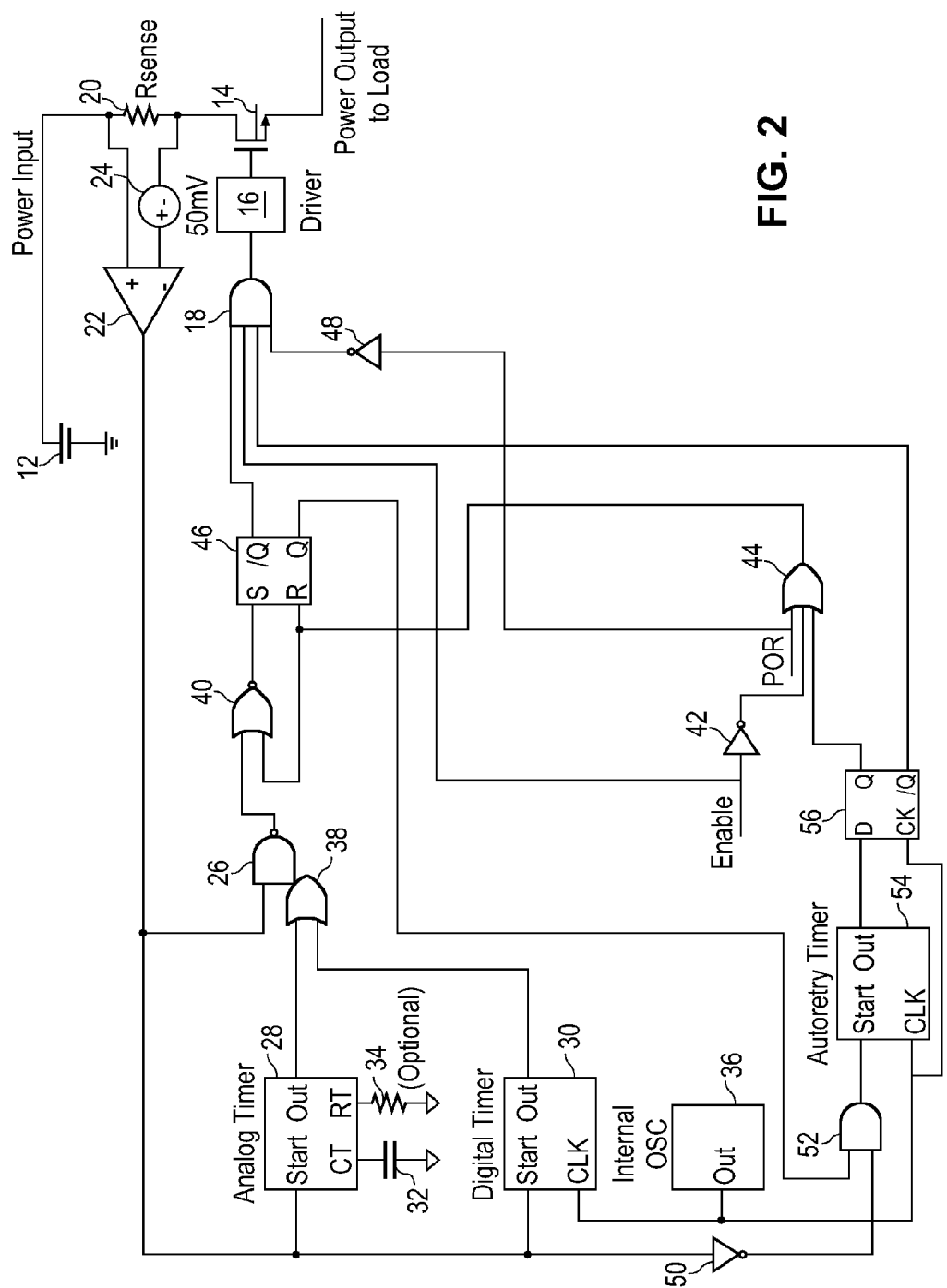
FIG. 2 illustrates the power controller of FIG. 1 with an autoretry circuit using the same oscillator as the digital timer in FIG. 1 to fix a maximum duty cycle of the transistor.

FIG. 2 illustrates the power controller of FIG. 1 with the addition of an autoretry circuit. Elements in FIGS. 1 and 2 labeled with the same numerals may be the same. An autoretry circuit automatically turns on the power transistor after a short delay with the assumption that the overcurrent that tripped the circuit breaker was transitory and no longer exists. In the prior art, there is a danger that the autoretry circuit may turn on the transistor too soon after the transistor had experienced the previous overcurrent condition. The heat generated by the transistor from the initial overcurrent condition may have not adequately dissipated before the autoretry circuits turns on the transistor again to be subjected to the same overcurrent. The buildup of heat could damage the transistor and damage the load.

The autoretry circuit of FIG. 2 limits the duty cycle (on time vs. total cycle time) of the transistor 14 so that the transistor 14 cannot be damaged by one or more autoretries.

In FIG. 2, in the event an overcurrent tripped the circuit breaker and shut off the transistor 14, the output of the current sense comparator 22 will be low. This signal is inverted by inverter 50 and applied to one input of an AND gate 52. The other input of the AND gate 52 is connected to the Q output of the flip flop 46. Accordingly, upon the flip flop 46 being set (/Q=0, Q=1) due to an overcurrent condition tripping the circuit breaker and shutting off the transistor 14, both inputs into the AND gate 52 will be high. This starts the autoretry timer 54. The autoretry timer 54 is identical to the digital timer 30 except that its counter times out after a longer time. In one embodiment the autoretry time is 820 ms or 81,910 clock pulses from oscillator 36. Since the autoretry counter and the digital timer 28 counter use the same oscillator, the ratio of the times of both timers are known and fixed.

When the autoretry timer 54 times out, its output generates a logical 1 pulse. Its output is connected to the D input of a D flip flop 56, which receives clock pulses from the oscillator 36. The Q output of the D flip flop 56 follows the output of the autoretry timer 54. The Q output is connected to an input of the OR gate 44. A high output of the D flip flop 56 resets the SR flip flop, causing the /Q output of the SR flip flop to be a logical 1. After a clock cycle, the D flip flop 56 changes state, and its inverted Q output (labeled /Q in FIG. 2) goes high. The high /Q output and the high /Q output of the SR flip flop 46 cause the AND gate 18 to output a logical 1 and turn back on the transistor 14. If the overcurrent condition still exists, the circuit breaker will again turn off the transistor 14 after a short delay. The autoretry circuit may be set to retry only once, before being reset by an external signal, or more than once.

The maximum duty cycle of the transistor 14 is thus fixed by the digital timer 28 and autoretry timer 54, where the maximum duty cycle is digital timer 30 delay divided by the combined duration of the digital timer 30 delay and the autoretry timer 54 delay. When it is desired to reduce this maximum duty cycle, the user may set the analog timer 28 to provide a circuit breaker trip time shorter than that provided by the digital timer 30.

Figure 3:
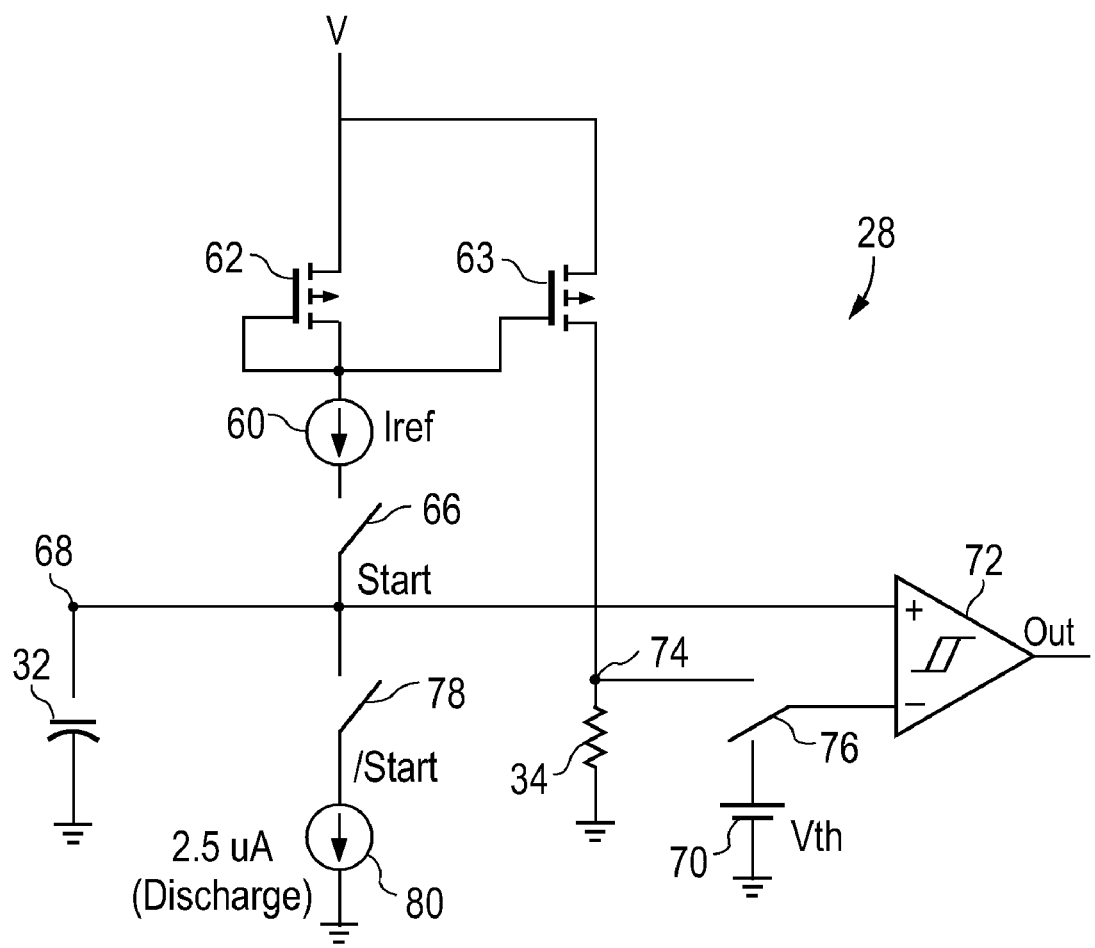
FIG. 3 illustrates one type of analog timer that can be used in FIGS. 1 and 2.

FIG. 3 illustrates one type of analog timer 28 that can be used in the circuits of FIGS. 1 and 2. A fixed current source 60 sets the current through one leg of a current mirror comprising transistors 62 and 63. Upon the start signal being received by the analog timer 28, a switch 66 is closed to begin the charging of capacitor 32, typically connected by the user to an external terminal 68 of the power controller chip. When the capacitor charges to the threshold voltage 70, a hysteresis comparator 72 trips to output a logical 1 signal. When an optional resistor 34 is connected to an external terminal 74 of the power controller chip, this is detected by the controller, and a switch 76 connects the comparator 72 to the resistor 34 terminal instead of to the fixed threshold voltage 70. The current mirror supplies a current through the resistor 34, and the voltage at the resistor terminal 74 is the threshold voltage for tripping the timer 28. Increasing the value of resistor 34 increases the timer trip time. When the start signal is low, switch 66 opens and switch 78 closes to discharge the capacitor 32 through current source 80.

Many different types and combinations of logic circuits may be used to implement the invention. The various logic levels described may be opposite logic levels. The entire power controller of FIG. 2 may be formed on a single chip except for the timing capacitor 32.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is claimed is:

1. A power controller system comprising:
   a switch control terminal for connection to a power switch for connecting a power supply to a load;
   a current detector sensing a current level through the switch, the current detector outputting an overcurrent signal when the current level is above a predetermined threshold;
   an analog timer connected to receive the overcurrent signal and, upon receiving the overcurrent signal, beginning a predetermined analog timer period, the analog timer generating a first timed out signal at the end of the predetermined analog timer period, the analog timer comprising a capacitor terminal for connection to a capacitor for causing the capacitor to have a varying voltage level, the analog timer having a threshold detector that determines when the voltage level of the capacitor meets a voltage threshold, the analog timer generating the first timed out signal when the voltage level meets the voltage threshold;
   a digital timer connected to receive the overcurrent signal and, upon receiving the overcurrent signal beginning a predetermined digital timer period, the digital timer generating a second timed out signal at the end of the predetermined digital timer period, the digital timer having a fixed digital timer period; and
   logic circuitry connected to an output of the analog timer and to an output of the digital timer for receiving the first timed out signal and the second timed out signal, the logic circuitry being connected to turn the power switch off upon an overcurrent signal continuing for a time equaling the first of the first timed out signal or the second timed out signal to be generated, wherein the digital timer provides a fixed maximum time that the power switch is on during an overcurrent situation.

2. The system of claim 1 further comprising a capacitor connected to the capacitor terminal of the analog timer, wherein the analog timer excluding the capacitor, digital timer, and logic circuitry are formed on a single integrated circuit chip.

3. The system of claim 1 wherein the analog timer excluding the capacitor, digital timer, and logic circuitry are formed on a single integrated circuit chip.

4. The system of claim 3 wherein the current detector comprises a comparator for comparing a current to a threshold value, the comparator being formed on the single integrated circuit chip.

5. The system of claim 3 further comprising a driver connected to the logic circuitry for controlling the power switch, the driver being formed on the single integrated circuit chip.

6. The system of claim 3 further comprising an oscillator clocking the digital timer, the oscillator being formed on the single integrated circuit chip such that an oscillator period is not changeable by an external signal applied to the single integrated circuit chip.

7. The system of claim 3 further comprising the power switch.

8. The system of claim 7 wherein the power switch is external to the single integrated circuit chip.

9. The system of claim 1 wherein the analog timer also comprises a resistor terminal for connection to a resistor, a value of the resistor affecting the analog timer period.

10. The system of claim 1 wherein the analog timer excluding the capacitor, digital timer, and logic circuitry are formed on a single integrated circuit chip, the system further comprising an automatic retry timer for automatically turning the power switch back on, at the end of an automatic retry timer period, after the power switch was switched off due to an overcurrent signal being generated, the automatic retry timer being formed on the single integrated circuit chip.

11. The system of claim 10 wherein the automatic retry timer is set to have a fixed automatic retry timer period such that the automatic retry timer period is not changeable by an external signal applied to the single integrated circuit chip.

12. The system of claim 11 wherein a duty cycle of the power switch due to the power switch being on during an overcurrent signal, then turned off by the logic circuitry, then turned on again by the automatic retry timer is fixed at a maximum duty cycle by fixing the digital timer period and the automatic retry timer period.

13. The system of claim 12 further comprising a single oscillator clocking both the digital timer and the automatic retry timer so that the digital timer period and the automatic retry timer period have a fixed ratio.

14. A method performed by a power controller system comprising:

controlling a power switch for connecting a power supply to a load;

sensing a current level through the switch by a current detector, the current detector outputting an overcurrent signal when the current level is above a predetermined threshold;

beginning a predetermined analog timer period upon an analog timer receiving the overcurrent signal, the analog timer comprising a capacitor, the analog timer causing the capacitor to have a varying voltage level, the analog timer having a threshold detector that determines when the voltage level of the capacitor meets a voltage threshold, the analog timer generating the first timed out signal when the voltage level meets the voltage threshold;

generating a first timed out signal by the analog timer at the end of the predetermined analog timer period;

beginning a predetermined digital timer period upon a digital timer receiving the overcurrent signal;

generating a second timed out signal by the digital timer at the end of the predetermined digital timer period, the digital timer having a fixed digital timer period; and receiving the first timed out signal and the second timed out signal by logic circuitry, the logic circuitry being connected to turn the power switch off upon an overcurrent signal continuing for a time equaling the first of the first timed out signal or the second timed out signal to be generated, wherein the digital timer provides a fixed maximum time that the power switch is on during an overcurrent situation.

15. The method of claim 14 wherein the analog timer excluding the capacitor, digital timer, and logic circuitry are formed on a single integrated circuit chip.

16. The method of claim 14 further comprising automatically turning the power switch back on by an automatic retry timer, at the end of an automatic retry timer period, after the power switch was switched off due to an overcurrent signal being generated.

17. The method of claim 16 wherein the automatic retry timer is formed on a single integrated circuit chip, wherein the automatic retry timer is set to have a fixed automatic retry timer period such that the automatic retry timer period is not changeable by an external signal applied to the single integrated circuit chip, wherein a duty cycle of the power switch due to the power switch being on during an overcurrent signal, then turned off by the logic circuitry, then turned on again by the automatic retry timer is fixed at a maximum duty cycle by fixing the digital timer period and the automatic retry timer period.

18. The method of claim 16 further comprising clocking both the digital timer and the automatic retry timer by a single oscillator on the single integrated circuit chip so that the digital timer period and the automatic retry timer period have a fixed ratio.

* * * * *